(12) United States Patent
Kim et al.

(10) Patent No.: US 12,038,559 B2
(45) Date of Patent: Jul. 16, 2024

(54) WINDOW COVER FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Hye Jin Kim, Daejeon (KR); Byoung Sun Ko, Daejeon (KR); Min Sang Park, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 239 days.

(21) Appl. No.: 17/237,130

(22) Filed: Apr. 22, 2021

(65) Prior Publication Data

US 2021/0333440 A1  Oct. 28, 2021

(30) Foreign Application Priority Data

Apr. 24, 2020 (KR) .................. 10-2020-0049928

(51) Int. Cl.
| | |
|---|---|
| *G02B 1/14* | (2015.01) |
| *B32B 27/34* | (2006.01) |
| *G02B 1/04* | (2006.01) |
| *G02F 1/1333* | (2006.01) |
| *G06F 1/16* | (2006.01) |

(52) U.S. Cl.
CPC ............... *G02B 1/14* (2015.01); *B32B 27/34* (2013.01); *G02B 1/04* (2013.01); *G02F 1/133305* (2013.01); *G06F 1/1652* (2013.01); *B32B 2307/51* (2013.01); *B32B 2457/202* (2013.01); *B32B 2457/206* (2013.01); *C09K 2323/03* (2020.08); *C09K 2323/06* (2020.08)

(58) Field of Classification Search
CPC .... G02B 1/04; G02B 1/14; C08J 7/046; C08J 2379/08; G06F 1/1652; B32B 27/34; B32B 2307/51; C09K 2323/06; C08L 79/08

See application file for complete search history.

(56) References Cited

U.S. PATENT DOCUMENTS

| | | | |
|---|---|---|---|
| 9,806,291 B2 | 10/2017 | Huh et al. | |
| 10,211,421 B2 | 2/2019 | Lee et al. | |
| 2010/0193468 A1* | 8/2010 | Burrows | H01L 23/562 |
| | | | 427/259 |

(Continued)

FOREIGN PATENT DOCUMENTS

| | | |
|---|---|---|
| JP | 201886802 A | 6/2018 |
| JP | 2018144285 A | 9/2018 |

(Continued)

OTHER PUBLICATIONS

SKinno News, Mar. 2019, https://skinnonews.com/archives/50688. [Machine Translation of Article].

*Primary Examiner* — Sophie Hon
(74) *Attorney, Agent, or Firm* — The Webb Law Firm

(57) ABSTRACT

Provided are a window cover film and a display panel including the same. More specifically, a window cover film includes a polyimide-based film, and an inorganic thin film layer and a hard coating layer formed on at least one surface of the polyimide-based film. A light transmittance measured at 388 nm is 50% or less and a total light transmittance measured at 400 to 700 nm is 87% or more, is provided.

13 Claims, 2 Drawing Sheets

(56) References Cited

U.S. PATENT DOCUMENTS

| | | | |
|---|---|---|---|
| 2016/0046830 A1* | 2/2016 | Kim | C08G 77/045 |
| | | | 522/170 |
| 2018/0004254 A1* | 1/2018 | Park | G06F 1/1656 |
| 2018/0273713 A1* | 9/2018 | Lyons | C23C 16/40 |
| 2019/0077917 A1* | 3/2019 | Jeong | G02B 1/14 |
| 2019/0077960 A1* | 3/2019 | Kim | C08G 73/1039 |
| 2019/0315105 A1* | 10/2019 | Isojima | B32B 27/281 |
| 2020/0024401 A1 | 1/2020 | Ryu et al. | |
| 2021/0317269 A1* | 10/2021 | Zoombelt | C08G 73/1082 |

FOREIGN PATENT DOCUMENTS

| | | | | |
|---|---|---|---|---|
| KR | 100647705 B1 | | 11/2006 | |
| KR | 1020130074167 A | | 7/2013 | |
| KR | 101641207 B1 | | 7/2016 | |
| KR | 1020170071661 A | | 6/2017 | |
| KR | 1020170073948 A | | 6/2017 | |
| KR | 1020170088642 A | | 8/2017 | |
| KR | 1020170136269 A | | 12/2017 | |
| KR | 1020180018307 A | | 2/2018 | |
| KR | 101839293 B1 | | 3/2018 | |
| KR | 1020180106212 A | | 10/2018 | |
| KR | 1020180131378 A | | 12/2018 | |
| KR | 1020190029110 A | | 3/2019 | |
| KR | 1020190090300 A | | 8/2019 | |
| KR | 102247137 B1 * | 5/2021 | | G02B 1/14 |

\* cited by examiner

WINDOW COVER FILM AND FLEXIBLE DISPLAY PANEL INCLUDING THE SAME

CROSS-REFERENCE TO RELATED APPLICATION

This application claims priority to Korean Patent Application No. 10-2020-0049928 filed Apr. 24, 2020, the disclosure of which is hereby incorporated by reference in its entirety.

BACKGROUND OF THE INVENTION

Field of the Invention

The following disclosure relates to a window cover film and a display panel including the same.

Description of Related Art

A thin display such as a liquid crystal display or an organic light emitting diode display is implemented in the form of a touch screen panel and is widely used in various smart devices characterized by portability including various wearable devices as well as smart phones and tablet PCs.

These portable touch screen panel-based displays are provided with a window cover for display protection on a display panel for protecting a display panel from scratches or external impact, and in recent years, since a foldable display device having flexibility to be folded and unfolded has been developed, the material of the window cover has been changed from glass to a film made of plastic.

In order to improve mechanical physical properties of a film made of plastic for use in the window cover and prevent an occurrence of scratches and the like, a hard coating layer is formed, but a problem such as an occurrence of lifting or peeling off of the hard coating layer or an occurrence of a curl may arise under high-temperature and high-humidity conditions by containing moisture. In addition, when the window cover film is used for a long time, yellowing may occur or a problem in physical properties such as durability and weather resistance due to old age may arise. For this, a sunscreen, an ultraviolet absorber, or the like may be added into the film in the production of a film, but when the additive is added in a large amount for blocking ultraviolet rays at a specific wavelength, the transmittance and the mechanical physical properties of the film may be deteriorated.

Accordingly, a film which allows an ultraviolet wavelength to be blocked for long-term use stability, has excellent durability and weather resistance, and also has a minimized moisture content even under high-temperature and high-humidity conditions so that an occurrence of peeling off and curling of the hard coating layer is improved, is in demand.

RELATED ART DOCUMENTS

Patent Documents

Korean Patent Laid-Open Publication No. 10-2013-0074167 (Jul. 4, 2013)

SUMMARY OF THE INVENTION

An embodiment of the present invention is directed to providing a window cover film in which yellowing due to long-term use is prevented and light resistance, durability, and weather resistance are excellent. In particular, the window cover film has excellent light resistance to an ultraviolet wavelength, prevents yellowing, has excellent weather resistance, and allows long-term use.

Another embodiment of the present invention is directed to providing a window cover film having excellent chemical resistance and excellent solvent resistance to a specific solvent. In general, it is necessary to form a functional coating layer such as a hard coating layer on a substrate for production of the window cover film, in which coating is performed using a coating solution having a composition of usually using a ketone-based solvent and an alcohol-based solvent as a main solvent. Therefore, solvent resistance to the solvent in coating is essential. In addition, after the functional coating layer is formed, a user performs cleaning while rubbing using mainly ethanol or acetone with the solvent for removing a stained pollutant during the use. Therefore, solvent resistance to the cleaning solvent is also required.

Another embodiment of the present invention is directed to providing a window cover film which has a low water vapor transmission rate so that the film is not deformed under high-temperature and high-moisture conditions in the production process and has excellent humidity or moisture barrier properties.

In addition, when an inorganic thin film layer is formed between a polyimide-based film and a hard coating layer, the window cover film expresses stronger adhesion between the hard coating layer and the polyimide-based film, and does not cause lifting or peeling off even under high-temperature and high-humidity conditions.

In addition, since a surface roughness is decreased and coatability is improved by the inorganic thin film layer, a thin film layer may be evenly coated in formation of the hard coating layer, and the window cover film hardly has pin holes after coating.

Another embodiment of the present invention is directed to providing a window cover film, which has no microcracks even when bending is repeated 10,000 times or more, more preferably 30,000 times, and still more preferably 50,000 times and may be applied to a surface of a display and the like having a curved shape.

In addition, when an inorganic thin film layer is formed between a polyimide-based film and a hard coating layer, the window cover film expresses stronger adhesion between the hard coating layer and the polyimide-based film, and does not cause lifting or cracks in bending motion.

Still another embodiment of the present invention is directed to providing a flexible display panel having improved light resistance, durability, and mechanical properties.

In one general aspect, a window cover film includes a polyimide-based film, and an inorganic thin film layer and a hard coating layer formed on at least one surface of the polyimide-based film, wherein a light transmittance measured at 388 nm is 50% or less and a total light transmittance measured at 400 to 700 nm is 87% or more.

In an exemplary embodiment, the window cover film may have a water vapor transmission rate of $5.0 \times 10^{-1}$ g/m$^2$/day or less.

In an exemplary embodiment, the window cover film may have a haze of 1.0% or less and a yellow index of 3.0 or less.

In an exemplary embodiment, the window cover film may have a haze change rate of 10% or less, the haze change rate being measured after storing the window cover film in a state of being immersed in methyl ethyl ketone for 0.5 hours.

In an exemplary embodiment, the window cover film may have a yellow index change rate of 2 or less, the yellow index change rate being measured after performing a process of irradiating UV at an intensity of 0.63 W/m$^2$ from a light source at 340 nm at a chamber temperature of 60° C., 12 times successively at 8 hours/cycle.

In an exemplary embodiment, the inorganic thin film layer may be any one or two or more selected from metals, metal oxides, metal nitrides, metal carbides, metal carbonitrides, and metal sulfides.

In an exemplary embodiment, the inorganic thin film layer may be any one or more selected from aluminum oxide, silicon oxide, titanium oxide, and zinc oxide.

In an exemplary embodiment, the inorganic thin film layer may be formed by atomic layer decomposition (ALD).

In an exemplary embodiment, the window cover film may be a laminate in which the polyimide-based film, and the inorganic thin film layer and the hard coating layer formed on at least one surface of the polyimide-based film are sequentially laminated.

In an exemplary embodiment, the inorganic thin film layer may be formed on all six surfaces of the polyimide-based film.

In an exemplary embodiment, the window cover film may be a laminate in which the polyimide-based film, the hard coating layer, and the inorganic thin film layer are sequentially laminated.

In an exemplary embodiment, the inorganic thin film layer may be formed on both an upper portion of the hard coating layer and side surfaces of the polyimide-based film.

In an exemplary embodiment, the window cover film may further include any one or more functional coating layers selected from an antistatic layer, an anti-fingerprint layer, an antifouling layer, an anti-scratch layer, a low-refractive layer, an antireflective layer, and an impact shock absorption layer.

In an exemplary embodiment, the polyimide-based film may have an elongation at break in accordance with ASTM D882 of 8% or more and a modulus of 6 GPa or more.

In an exemplary embodiment, the polyimide-based film may have a light transmittance of 5% or more as measured at 388 nm in accordance with ASTM D1746, a total light transmittance of 87% or more as measured at 400 to 700 nm, a haze of 2.0% or less, a yellow index of 5.0 or less, and a b* value of 2.0 or less.

In an exemplary embodiment, the polyimide-based film may include a polyamideimide structure.

In an exemplary embodiment, the polyimide-based film may include a unit derived from a fluorine-based aromatic diamine, a unit derived from an aromatic dianhydride, and a unit derived from an aromatic diacid dichloride.

In an exemplary embodiment, the polyimide-based film may further include a cycloaliphatic dianhydride-derived unit.

In an exemplary embodiment, the polyimide-based film may have a thickness of 10 to 500 μm, the inorganic thin film layer may have a thickness of 2 to 500 nm, and the hard coating layer may have a thickness of 1 to 50 μm.

In another general aspect, a flexible display panel includes the window cover film of one selected from the above exemplary embodiments.

Other features and aspects will be apparent from the following detailed description, the drawings, and the claims.

DESCRIPTION OF THE INVENTION

Figure 1:
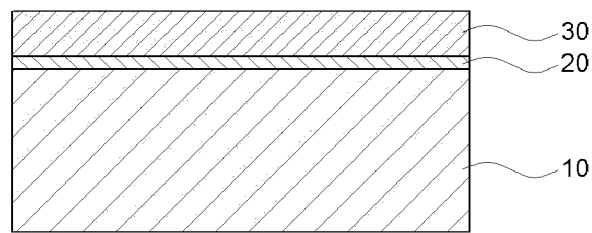
FIG. 1 is a cross-sectional view of a window cover film according to an exemplary embodiment of the present invention.

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a polyimide-based resin is used as a term including a polyimide resin or a polyamideimide resin. A polyimide-based film is used likewise.

In the present invention, a "polyimide-based resin solution" has the same meaning as a "composition for forming a polyimide-based film" and a "polyamideimide solution". In addition, a polyimide-based resin and a solvent may be included for forming the polyimide-based film.

In the present invention, a "film" is obtained by applying and drying the "polyimide-based resin solution" on a support and carrying out peeling off, and may be stretched or unstretched.

In the present invention, forming "on" something includes not only a case of forming "directly on" something but also a case in which another part is present therebetween.

The inventors of the present invention conducted studies for solving the above problems, and as a result, found that when a common sunscreen or ultraviolet absorber is used, the weather resistance and the light transmittance of a polyimide-based film is deteriorated, but in the present invention, a film designed with a specific laminated structure is provided to provide a window cover film satisfying all physical properties to be desired, thereby completing the present invention.

Specifically, in an exemplary embodiment of the present invention, it was confirmed that a window cover film having a laminated structure including a polyimide-based film, and an inorganic thin film layer and a hard coating layer formed on at least one surface on the polyimide-based film, thereby satisfying all physical properties of excellent light resistance, durability, and solvent resistance. Specifically, a window cover film satisfying all physical properties of a light transmittance measured at 388 nm of 50% or less and a total light transmittance measured at 400 to 700 nm of 87% or more, may be provided. By satisfying the range, the window cover film is less yellowed even in the case of being exposed to ultraviolet rays for a long time and has a less changed modulus so that changes in the optical physical properties and the mechanical physical properties may be minimized, which is thus preferred.

As long as the physical properties are obtained, the production means of the present invention is not particularly limited, but taking one means for obtaining the physical properties of the present invention as an example, the inorganic thin film layer is formed by atomic layer deposition (ALD), so that the inorganic thin film may be formed without deterioration of the optical properties and the chemical physical properties of the polyimide-based film, the surface roughness of the polyimide-based film may be further lowered, and the inorganic thin film layer may be formed on not only one surface or both surfaces of the film but also all six surfaces of the film, thereby providing a film having a lower water vapor transmission rate. In addition, solvent resistance is excellent in forming a coating layer such as a hard coating layer, adhesion between the hard coating layer and the polyimide-based film is further improved, and a problem of an occurrence of pin holes in the coating layer may be solved.

In addition, at least one selected from inorganic oxide layers such as aluminum oxide, silicon oxide, titanium oxide, and zinc oxide is formed as the inorganic thin film layer to block moisture penetration and increase chemical affinity with a composition having a function of blocking a UV region and a polar moiety of a coating layer, thereby achieving an effect of further increasing adhesive force and adhesive strength between the inorganic thin film layer and the hard coating layer.

As described above, the lamination structure of the window cover film of the present invention is not limited as long as the structure satisfies the physical properties, but the present invention is characterized by having a lamination structure including the polyimide-based film, the inorganic thin film layer, and the hard coating layer, and specifically, an exemplary embodiment of the present invention is a laminate in which the polyimide-based film, and the inorganic thin film layer and the hard coating layer formed on at least one surface of the polyimide-based film are sequentially laminated. Otherwise, the polyimide-based film, the hard coating layer, and the inorganic thin film layer may be sequentially laminated.

More specifically, a first exemplary embodiment of the present invention may be a laminate in which a polyimide-based film 10, an inorganic thin film layer 20, and a hard coating layer 30 are sequentially laminated. Here, the inorganic thin film layer 20 may be formed on the one entire surface, as shown in FIG. 1. By lamination as such, a film which may satisfy the physical properties of a light transmittance measured at 388 nm of 50% or less and a total light transmittance measured at 400 to 700 nm of 87% or more, and also, has a low surface roughness and satisfies all of light resistance, long-term weather resistance, solvent resistance, and moisture barrier properties, may be provided. In addition, coatability is further improved in forming the hard coating layer due to a uniform surface caused by the inorganic thin film layer, thereby preventing pin holes and the like. Besides, when coating is performed on a support having an ALD layer formed thereon, it was confirmed that physical properties, optical properties, a water contact angle, and uniformity of surface hardness are improved.

Figure 2:
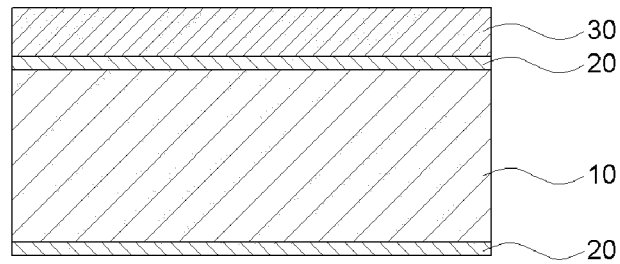
FIG. 2 is a cross-sectional view of a window cover film according to an exemplary embodiment of the present invention.

A second exemplary embodiment of the present invention may be a laminate in which the inorganic thin film layer 20, the polyimide-based film 10, the inorganic thin film layer 20, and the hard coating layer 30 are sequentially laminated, as shown in FIG. 2. Here, the inorganic thin film layer 20 may be formed on the one entire surface, as shown in FIG. 2. By lamination as such, a film having better light resistance and moisture barrier properties than those the first exemplary embodiment may be provided. In addition, by further forming an ALD layer on the opposite surface of the coating surface, processability may be improved due to uniform surface chemistry in applying or printing an adhesive for laminating another film later.

Figure 3:
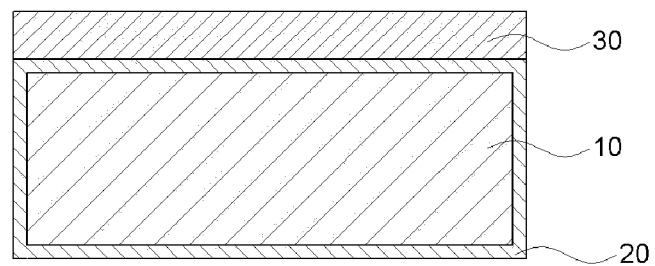
FIG. 3 is a cross-sectional view of a window cover film according to an exemplary embodiment of the present invention.

A third exemplary embodiment of the present invention may be a laminate in which the polyimide-based film 10, the inorganic thin film layer 20 formed on all six surfaces of the polyimide-based film, and the hard coating layer 30 formed on one surface of the inorganic thin film layer are sequentially laminated, as shown in FIG. 3. Here, the inorganic thin film layer 20 may be formed on the one entire surface, as shown in FIG. 3. By lamination as such, a film having better light resistance and moisture barrier properties than those of the first exemplary embodiment may be provided. In addition, when an optical adhesive or the like is applied on the inorganic thin film layer on the opposite surface to the surface on which the hard coating layer is formed, coatability may be further improved. In the third exemplary embodiment, unlike the second exemplary embodiment, moisture permeating a side portion of the film is prevented, thereby having an effect of decreasing an edge curl which is, when left for a long time, caused by moisture permeating an edge portion of the film.

Figure 4:
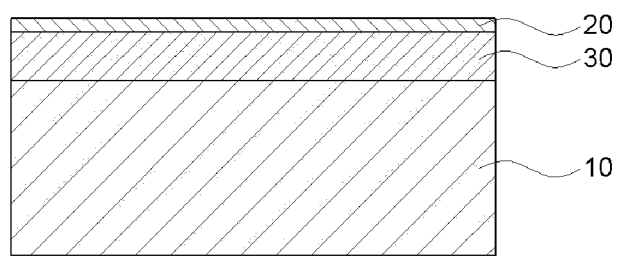
FIG. 4 is a cross-sectional view of a window cover film according to an exemplary embodiment of the present invention.

A fourth exemplary embodiment of the present invention may be a laminate in which the polyimide-based film 10, the hard coating layer 30, and the inorganic thin film layer 20 are sequentially laminated, as shown in FIG. 4. Here, the inorganic thin film layer 20 may be formed on the one entire surface, as shown in FIG. 4. By lamination as such, a film which has a low surface roughness and satisfies all of light resistance, long-term weather resistance, solvent resistance, and moisture barrier properties may be provided. In addition, fouling resistance and scratch resistance may be imparted. In addition, a film to which an antistatic function is added without forming a separate an antistatic layer may be provided.

Figure 5:
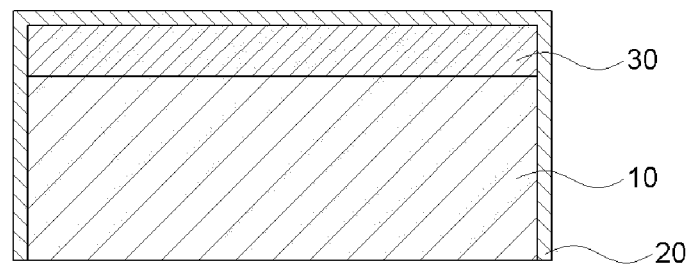
FIG. 5 is a cross-sectional view of a window cover film according to an exemplary embodiment of the present invention.

A fifth exemplary embodiment of the present invention may be a laminate in which the polyimide-based film 10 and the hard coating layer 30 are sequentially laminated, and the inorganic thin film layer 20 is formed on the upper portion of the hard coating layer and on the side surface of the polyimide-based film, as shown in FIG. 5. Here, the inorganic thin film layer 20 may be formed on the one entire surface, as shown in FIG. 5. By lamination as such, curl is prevented and a film having better antistatic properties may be provided.

The first to fifth exemplary embodiments only illustrate the present invention in more detail, and the present invention is not limited thereto.

The window cover film having a specific lamination structure according to an exemplary embodiment of the present invention may have excellent light resistance, specifically, a light transmittance measured at 388 nm of 50% or less, more preferably 25 to 50%. By satisfying the range, a transparent PI film having excellent long-term weather resistance and light resistance properties may be developed.

In addition, the window cover film may have a water vapor transmission rate of $5.0 \times 10^{-1}$ g/m$^2$/day or less, more specifically $3.0\times10^{-1}$ g/m²/day or less, and within the range, decreased durability and a curl occurrence caused by moisture absorption may be improved.

In addition, the window cover film may have a haze change rate of 10% or less, more specifically 5 to 10%, the haze change rate being measured after stored in a state of being immersed in methyl ethyl ketone for 0.5 hours, and within the range, a film having excellent solvent resistance and excellent coatability and coating quality may be provided.

In addition, the window cover film may have a yellow index change amount of 2 or less, more specifically 0.5 to 1.5, the yellow index being measured after performing a process of irradiating UV at an intensity of 0.63 W/m² from a light source at 340 nm at a chamber temperature of 60° C., 12 times successively at 8 hours/cycle, and within the range, light resistance is excellent even in the case of being exposed to ultraviolet rays for a long term, and thus, physical properties appropriate for use as the window cover film may be provided.

In an exemplary embodiment of the present invention, the polyimide-based film may have a thickness of 10 to 500 μm, the inorganic thin film layer may have a thickness 2 to 500 nm, and the hard coating layer may have a thickness of 1 to 50 μm. Though not limited thereto, a window cover film which satisfies the lamination structure as described above, is a thin film, has a significantly low water vapor transmission rate, and is flexible may be provided.

Hereinafter, each constituent element of the present invention will be described in more detail.

<Polyimide-Based Film>

In an exemplary embodiment of the present invention, the polyimide-based film has excellent optical physical properties and mechanical physical properties, and may be formed of a material having elasticity and restoring force.

In an exemplary embodiment of the present invention, the polyimide-based film may have a thickness of 10 to 500 μm, 20 to 250 μm, or 30 to 110 μm.

In an exemplary embodiment of the present invention, the polyimide-based film may have the physical properties of a light transmittance of 5% or more as measured at 388 nm in accordance with ASTM D1746, a total light transmittance of 87% or more, 88% or more, or 89% or more as measured at 400 to 700 nm, a haze in accordance with ASTM D1003 of 2.0% or less, 1.5% or less, or 1.0% or less, a yellow index in accordance with ASTM E313 of 5.0 or less, 3.0 or less, or 0.4 to 3.0, and a b* value of 2.0 or less, 1.3 or less, or 0.4 to 1.3. Within the range, optical physical properties appropriate for being applied to the window cover film may be provided.

In an exemplary embodiment of the present invention, the polyimide-based film may have a modulus in accordance with ASTM D882 of 3 GPa or more, 4 GPa or more, 5 GPa or more, or 6 GPa or more and an elongation at break of 8% or more, 12% or more, or 15% or more. Within the range, optical physical properties appropriate for being applied to the window cover film may be provided.

In an exemplary embodiment of the present invention, the polyimide-based film is formed of a polyimide-based resin, and, in particular, a polyimide-based resin having a polyamideimide structure.

In addition, more preferably, the polyimide-based resin may be a polyamideimide-based resin including a fluorine atom and an aliphatic cyclic structure, and thus, the polyimide-based film may have excellent transparency, appearance quality, mechanical physical properties, and dynamic bending properties.

In an exemplary embodiment of the present invention, as an example of the polyamideimide-based resin including a fluorine atom and an aliphatic cyclic structure, a polyamideimide polymer is preferred, which is prepared by preparing an amine-terminated polyamide oligomer derived from a first fluorine-based aromatic diamine and an aromatic diacid dichloride and polymerizing a monomer derived from the amine-terminated polyamide oligomer, a second fluorine-based aromatic diamine, an aromatic dianhydride, and a cycloaliphatic dianhydride, since the object of the present invention is achieved better. The first fluorine-based aromatic diamine and the second fluorine-based aromatic diamine may be the same or different kinds.

In an exemplary embodiment of the present invention, when the amine-terminated oligomer having an amide structure in a polymer chain formed by the aromatic diacid dichloride is included as the monomer of the diamine, not only the optical physical properties may be improved, but also, in particular, the mechanical strength including the micro-flexural modulus may be improved, and the dynamic bending properties may be further improved, and thus, the present invention may be appropriately used as the window cover film of a flexible display which repeats an operation of folding and unfolding.

In an exemplary embodiment of the present invention, when the polyamide oligomer block is included, a mole ratio between a diamine monomer including the amine-terminated polyoligomer and the second fluorine-based aromatic diamine and a dianhydride monomer including the aromatic dianhydride and the cycloaliphatic dianhydride of the present invention may be 1:0.9 to 1.1, preferably 1:1. In addition, a content of the amine-terminated polyamide oligomer with respect to the entire diamine monomer is not particularly limited, but it is preferred to include the amine-terminated polyamide oligomer at 30 mol % or more, preferably 50 mol % or more, and more preferably 70 mol % or more for satisfying the mechanical physical properties, the yellow index, and the optical properties of the present invention. In addition, a composition ratio of the aromatic dianhydride and the cycloaliphatic dianhydride is not particularly limited, but a ratio of 30 to 80 mol %:70 to 20 mol % is preferred considering the transparency, the yellow index, and the mechanical physical properties of the present invention, but the present invention is not necessarily limited thereto.

In an exemplary embodiment of the present invention, the polyamideimide-based resin may include a fluorine-based aromatic diamine-derived unit, and may have excellent mechanical physical properties and optical physical properties by including the unit.

In an exemplary embodiment of the present invention, the polyamideimide-based resin may include a cycloaliphatic dianhydride-derived unit, and may have excellent optical physical properties by including the unit.

In an exemplary embodiment of the present invention, the polyamideimide-based resin may include a fluorine-based aromatic diamine-derived unit, an aromatic dianhydride-derived unit, and an aromatic diacid dichloride-derived unit, and may have excellent mechanical physical properties and optical physical properties by including the units.

In an exemplary embodiment of the present invention, as the polyamideimide-based resin, a quaternary copolymer including all of the fluorine-based aromatic diamine-derived unit, the aromatic dianhydride-derived unit, the cycloaliphatic dianhydride-derived unit, and the aromatic diacid dichloride-derived unit is used, thereby providing a film which may satisfy optical properties such as transparency and mechanical physical properties, prevents bending under high-temperature and high-humidity conditions, has a less changed haze, and has little heat shrinkage.

In addition, another example of the polyamideimide-based resin including a fluorine atom and an aliphatic cyclic structure in the present invention may be a polyamideimide-based resin obtained by mixing, polymerizing, and imidizing the fluorine-based aromatic diamine, the aromatic dianhydride, the cycloaliphatic dianhydride, and the aromatic diacid dichloride. The resin has a random copolymer structure, in which 40 mol % or more, preferably 50 to 80 mol of the aromatic diacid dichloride may be used with respect to 100 mol of the diamine, a content of the aromatic dianhydride may be 10 to 50 mol and a content of the cyclic aliphatic dianhydride may be 10 to 60 mol, and the resin may be prepared by performing polymerization at a mole ratio of a sum of a diacid chloride and a dianhydride to the diamine monomer of 1:0.8 to 1.1. Preferably, the polymerization is performed at a mole ratio of 1:1. The random polyamide-imide of the present invention is somewhat different in the optical properties such as transparency and mechanical physical properties as compared with the block polyamide-imide resin, but may belong to the range of the present invention.

In an exemplary embodiment of the present invention, as the fluorine-based aromatic diamine component, a mixture of 2,2'-bis(trifluoromethyl)-benzidine and another known aromatic diamine component may be used, or 2,2'-bis(trifluoromethyl)-benzidine may be used alone. By using the fluorine-based aromatic diamine as such, excellent optical properties may be improved and the yellow index may be improved, based on the mechanical physical properties required in the present invention, as the polyamideimide-based film. In addition, the micro-flexural modulus of the polyamideimide-based film may be improved to improve the mechanical strength of the hard coating film and further improve the dynamic bending properties.

The aromatic dianhydride may be at least one or two or more selected from 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride)(6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxylphenyl) dimethyl silane dianhydride (SiDA), and bis(dicarboxyphenoxy) diphenyl sulfide dianhydride (BDSDA), but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo [2.2.2]oct-7-en-2,3,5,6-tetracarboxylic dianhydride (BTA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (ICDA), and derivatives thereof may be used.

In an exemplary embodiment of the present invention, when the amide structure in the polymer chain is formed by the aromatic diacid dichloride, not only optical physical properties may be improved, but also mechanical strength may be greatly improved, and also the dynamic bending properties may be further improved.

As the aromatic diacid dichloride, a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but the present invention is not limited thereto.

Hereinafter, a method of producing the polyimide-based film will be illustrated.

In an exemplary embodiment of the present invention, the polyimide-based film may be produced by applying a "polyimide-based resin solution" including a polyimide-based resin and a solvent on a substrate, and performing drying or drying and stretching. That is, the polyimide-based film may be produced by a solution casting method.

As an example, the polyimide-based film may be produced by including the following steps: reacting a fluorine-based aromatic diamine and an aromatic diacid dichloride to prepare an oligomer, reacting the thus-prepared oligomer with the fluorine-based aromatic diamine, an aromatic dianhydride, and a cycloaliphatic dianhydride to prepare a polyamic acid solution, imidizing the polyamic acid solution to prepare a polyamideimide resin, and applying a polyamideimide solution in which a polyamideimide resin is dissolved in an organic solvent to form a film.

Hereinafter, each step will be described in more detail, taking a case in which a block polyamideimide film is produced as an example.

The step of preparing an oligomer may include reacting the fluorine-based aromatic diamine and the aromatic diacid dichloride and purifying and drying the obtained oligomer. In this case, the fluorine-based aromatic diamine may be introduced at a mole ratio of 1.01 to 2 with respect to the aromatic diacid dichloride to prepare an amine-terminated polyamide oligomer monomer. A molecular weight of the oligomer monomer is not particularly limited, but for example, when the weight average molecular weight is in a range of 1000 to 3000 g/mol, better physical properties may be obtained.

In addition, it is preferred to use an aromatic carbonyl halide monomer such as terephthaloyl chloride or isophthaloyl chloride, not terephthalic ester or terephthalic acid itself for introducing an amide structure, and this is, though is not clear, considered to influence the physical properties of the film by a chlorine element.

Next, the step of preparing a polyamic acid may be performed by a solution polymerization reaction in which the thus-prepared oligomer is reacted with the fluorine-based aromatic diamine, the aromatic dianhydride, and the cycloaliphatic dianhydride in an organic solvent. Here, the organic solvent used for the polymerization reaction may be, as an example, any one or two or more polar solvents selected from dimethylacetamide (DMac), N-methyl-2-pyrrolidone (NMP), dimethylformamide (DMF), dimethylsulfoxide (DMSO), ethylcellosolve, methylcellosolve, acetone, ethyl acetate, m-cresol, and the like.

More specifically, the fluorine-based aromatic diamine and the aromatic diacid dichloride are reacted to prepare an intermediate in the form of an oligomer including an amide unit, and then the oligomer is reacted with the fluorine-based aromatic diamine, the aromatic dianhydride, and the cycloaliphatic dianhydride to prepare a polyamic acid solution, thereby producing a polyamideimide-based film in which the amide intermediate is uniformly distributed. As such, the amide intermediate is uniformly distributed in the entire film, whereby mechanical physical properties are excellent, optical properties are excellent, and coatability and coating uniformity of a coating composition used in a post-coating process of the hard coating layer or the like are further improved on the entire area of the film, to further improve the optical physical properties of the final window cover film, and thus, a film having excellent optical properties without an occurrence of an optical stain such as rainbow and mura may be provided.

Next, the step of imidization to prepare a polyamideimide resin may be performed by chemical imidization, and more preferably, a polyamic acid solution is chemically imidized using pyridine and an acetic anhydride. Subsequently, imidization is performed using an imidization catalyst and a dehydrating agent at a low temperature of 150° C. or lower, preferably 100° C. or lower, and more preferably 50 to 150° C.

By the method as such, uniform mechanical physical properties may be imparted to the entire film as compared with the case of an imidization reaction by heat at a high temperature.

As the imidization catalyst, any one or two or more selected from pyridine, isoquinoline, and β-quinoline may be used. In addition, as the dehydrating agent, any one or two or more selected from an acetic anhydride, a phthalic anhydride, a maleic anhydride, and the like may be used, but the present invention is not necessarily limited thereto.

In addition, an additive such as a flame retardant, an adhesion improver, inorganic particles, an antioxidant, a UV inhibitor, and a plasticizer may be mixed with the polyamic acid solution to prepare the polyamideimide resin.

In addition, after the imidization, the resin is purified using a solvent to obtain a solid content, which may be dissolved in a solvent to obtain a polyamideimide solution. The solvent may include N,N-dimethyl acetamide (DMAc) and the like, but is not limited thereto.

The step of forming a film from the polyamideimide solution is performed by applying the polyamideimide solution on a substrate, and then drying the solution in a drying step divided into a dry area. In addition, stretching may be performed before or after the drying, and a heat treatment step may be further performed after the drying or stretching step. As the substrate, for example, glass, stainless steel, a film, or the like may be used, but the present invention is not limited thereto. Application may be performed by a die coater, an air knife, a reverse roll, a spray, a blade, casting, gravure, spin coating, and the like.

<Inorganic Thin Film Layer>

In an exemplary embodiment of the present invention, the inorganic thin film layer may provide a film which lowers the surface roughness of the polyimide-based film or the hard coating layer, is more solid and uniform, and satisfies the physical properties of a light transmittance measured at 388 nm of 50% or less.

When the inorganic thin film layer is formed by atomic layer deposition (ALD), a more uniform and dense inorganic thin film layer is formed while physical and chemical deformation of the polyimide-based film is minimized, which is appropriate for expressing the physical properties of excellent light resistance, chemical resistance, and moisture barrier properties and thus preferred, but the present invention is not limited thereto. That is, a deposition method selected from chemical vapor deposition (CVD), physical vapor deposition (PVD), pulsed laser deposition (PLD), e-beam evaporation, thermal evaporation, laser molecular beam epitaxy (L-MBE), and the like is also possible, and is not intended to be excluded from the present invention.

More specifically, for example, the inorganic thin film layer may be any one or two or more selected from metals, metal oxides, metal nitrides, metal carbides, metal carbonitrides, and metal sulfides.

Specifically, for example, the inorganic thin film may include a molecule including an atom of at least one metal element selected from the group consisting of aluminum, calcium, magnesium, silicon, titanium, and zirconium and an atom of at least one nonmetallic element selected from the group consisting of carbon, nitrogen, sulfur, and oxygen, and more preferably, uses at least one selected from aluminum oxide, silicon oxide, titanium oxide, and zinc oxide, thereby providing a window cover film having excellent transparency while having light resistance, which is thus preferred.

The inorganic thin film layer may have a thickness of 2 to 500 nm, more specifically 5 to 450 nm, and more specifically 10 to 400 nm, and within the range, the inorganic thin film layer may be thin and be appropriate for expressing the physical properties of improved coatability and a decreased surface roughness, but the present invention is not limited thereto.

Hereinafter, a method of forming the inorganic thin film layer by atomic layer deposition (ALD) will be described in detail.

An example of a reactant which may be used in the present invention may be selected from the group consisting of water, oxygen, ozone, hydrogen peroxide, alcohol, $NO_2$, $N_2O$, $NH_3$, $N_2$, $N_2H_4$, $C_2H_4$, $HCOOH$, $CH_3COOH$, $H_2S$, $(C_2H_5)_2S_2$, $N_2O$ plasma, hydrogen plasma, oxygen plasma, $CO_2$ plasma, and $NH_3$ plasma, but the present invention is not limited thereto.

In the present invention, it is more preferred to subject a substrate surface to a plasma treatment, a corona discharge treatment, a UV irradiation treatment, an ozone treatment, and the like before forming an ALD layer, for adhesive strength.

Here, distribution of a functional group formed on the substrate surface may be adjusted to change an embodiment of forming the inorganic thin film layer. For a formation degree of the functional group, the strength and the time of the treatment described above may be adjusted to an amount of the functional group.

Next, the polyimide-based film or the polyimide-based film having the hard coating layer formed thereon is placed in a reactive chamber and a metal precursor including a metal is introduced to each surface under a predetermined vacuum atmosphere to bring the film into contact with the metal.

A specific example of the precursor which may be used in the present invention may be, though not limited thereto, selected from the group consisting of $AlCl_3$, trimethyl aluminum (TMA), $Al(CH_3)_2Cl$, $Al(C_2H_5)_3$, $Al(OC_2H_5)_3$, $Al(N(C_2H_5)_2)_3$, $Al(N(CH_3)_2)_3$, $SiCl_4$, $SiCl_2H_2$, $Si_2Cl_6$, $Si(C_2H_5)H_2$, $Si_2H_6$, $TiF_4$, $TiCl_4$, $TiI_4$, $Ti(OCH_3)_4$, $Ti(OC_2H_5)_4$, $Ti(N(CH_3)_2)_4$, $Ti(N(C_2H_5)_2)_4$, $Ti(N(CH_3)(C_2H_5))_4$, $VOCl_3$, $Zn$, $ZnCl_2$, $Zn(CH_3)_2$, $Zn(C_2H_5)_2$, $ZnI_2$, $ZrCl_4$, $ZrI_4$, $Zr(N(CH_3)_2)_4$, $Zr(N(C_2H_5)_2)_4$, $Zr(N(CH_3)(C_2H_5))_4$, $HfCl_4$, $HfI_4$, $Hf(NO_3)_4$, $Hf(N(CH_3)(C_2H_5))_4$, $Hf(N(CH_3)_2)_4$, $Hf(N(C_2H_5)_2)_4$, $TaCl_5$, $TaF_5$, $TaI_5$, $Ta(O(C_2H_5))_5$, $Ta(N(CH_3)_2)_5$, $Ta(N(C_2H_5)_2)_5$, $TaBr_5$, and the like.

After the precursor is reacted with the substrate surface, a nonreactive gas such as argon is purged, and a reactant including at least one selected from the group consisting of carbon, nitrogen, sulfur, and oxygen is introduced and brought into contact with the surface.

Subsequently, the unreactive gas may be purged to form an inorganic thin film layer, and the step of forming a solid ceramic layer for forming the solid ceramic layer including a nonmetal and a metal as such, the step of introducing an precursor on the solid ceramic layer, the purging step, the step of introducing a reactant, and the purging step may be repeated to form a solid inorganic thin film layer having a predetermined thickness. When a compound is introduced to a polymer substrate by atomic layer deposition, an embodiment of forming the inorganic film formation may be changed depending on a degree of supplying a precursor as compared with a reaction area.

In performing an ALD process, first, a deposition process should be composed of a series of separated process steps. If there is no separation between two reactants and the reactants are mixed, a gaseous reaction will occur. Second, a reaction between the reactant and the surface should occur by a self-limited reaction. Third, the self-limited reaction or chemical adsorption should be a main reaction.

A flow rate in the ALD process should be adjusted depending on a flow form of the reactant, and a larger amount of carrier gas for injecting the intermediate and the reactant is effective, but it is necessary to adjust a carrier gas introduction amount depending on a volume of the chamber. A commonly used carrier gas may be an inert gas, and is not particularly limited, but may be argon, nitrogen, and the like.

A process temperature in the ALD reaction most importantly depends on a reaction temperature of the precursor. The process temperature is determined within the window of the precursor, and may be set depending on a heatable range of the substrate. That is, considering a temperature range where substrate damage is avoidable and a reaction temperature range of the precursor, it is more preferred to proceed with the reaction at the highest temperature. For example, the process temperature in the ALD reaction may be appropriately selected to a degree of not affecting the substrate in a range of 25 to 400° C.

A vacuum degree in the chamber may be generally from $7.6 \times 10^{-11}$ of an ultrahigh vacuum level to several torr of a vacuum degree level which may be implemented by a first pump (rough pump), and is determined under a condition of several torr or higher vacuum than several torr. Since a pressure when injecting the precursor and the reactant is more effective at a higher vacuum degree, it is preferred to proceed with the reaction at a high vacuum degree.

Injection and a purge time of the precursor and the reactant may be factors for adjusting the film thickness more directly. A feed supply time for a sufficiently long time is needed, and when the purge time is not sufficient, excellent thickness uniformity of the thin film by a CVD effect is deteriorated. Therefore, the injection time may be in a range of 0.1 to 10 sec, and the purge time is increased in proportion to the injection time, within a range of 1 to 30 sec.

<Hard Coating Layer>

Next, the hard coating layer will be described in detail.

In an exemplary embodiment of the present invention, the hard coating layer may be disposed on the inorganic deposited layer to protect the surface of the deposited layer, to protect the surface from physical and chemical damage, to further improve a transmittance, and to further improve the mechanical physical properties of the entire optical laminate.

In addition, the hard coating layer may have a pencil hardness of 2H or more, 3H or more, or 4H or more, may have no scratch occurrence at 10 times/1 Kgf, 20 times/1 Kgf, or 30 times/1 Kgf in scratch evaluation using steel wool (#0000, from Reveron), and may have a water contact angle after the evaluation of 80° or more, 90° or more, or 100° or more.

In addition, the hard coating layer may be formed at a thickness of 1 to 50% of the entire thickness of the optical laminate. Specifically, the hard coating layer may maintain optical properties while having excellent hardness. The hard coating layer may have a thickness of 1 to 50 μm, and more preferably 1 to 30 μm. When the thickness is within the range, a cured layer maintains flexibility while having excellent hardness, so that substantially no curl may occur.

In addition, in order to allow uniform coatability and mutual complementarity with the inorganic deposited layer, have no crack occurrence even when applying a repetitive bending motion, and further lower water vapor transmission rate, a silsesquioxane-based compound, more specifically, an alicyclic epoxidized silsesquioxane (epoxidized cycloalkyl substituted silsesquioxanes)-based compound may be included.

Here, the silsesquioxane-based compound may have a weight average molecular weight of 1,000 to 20,000 g/mol. When the weight average molecular weight is within the above range, the composition for forming a hard coating layer may have an appropriate viscosity. Thus, flowability, coatability, curing reactivity, and the like of the composition for forming a hard coating layer may be further improved. Further, the hardness of the hard coating layer may be improved. Also, the flexibility of the hard coating layer may be improved to suppress a curl occurrence. Preferably, the silsesquioxane-based compound may have a weight average molecular weight of 1,000 to 18,000 g/mol, and more preferably 2,000 to 15,000 g/mol. The weight average molecular weight is measured using GPC.

The silsesquioxane-based compound includes, for example, a repeating unit derived from a trialkoxysilane compound represented by the following Chemical Formula 1:

  [Chemical Formula 1]

wherein A is a C1 to C10 linear or branched alkyl group substituted with epoxy on a C3 to C7 alicyclic alkyl group, and R is independently a C1 to C3 alkyl group.

Here, the alkoxysilane compound may be one or more of 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound may include a repeating unit derived from a trialkoxysilane compound represented by Chemical Formula 2 and a repeating unit derived from a diakoxysilane compound represented by Chemical Formula 3. In this case, the silsesquioxane-based compound may be prepared by mixing 0.1 to 100 parts by weight of a dialkoxysilane compound with respect to 100 parts by weight of a trialkoxysilane compound and performing condensation polymerization. In this case, though the cause may not be clearly described, the surface hardness is further increased and the bending properties are significantly increased, which is thus preferred. The effect of the bending properties is considered to be represented better by the alicyclic alkyl group substituted with epoxy in Chemical Formula 1, and the effect increase may be greater as compared with the compound having no alicyclic group.

  [Chemical Formula 2]

wherein $R_a$ is a linear or branched alkyl group selected from C1 to C5, and A and R are as defined in Chemical Formula 1.

A specific example of the compound of Chemical Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, 2-(3,4-epoxycyclohexyl)ethylmethyldiethoxysilane, and the like, but is not limited thereto, and the compound may be used alone or in combination of two or more.

In addition, in an exemplary embodiment of the present invention, the hard coating layer may include an inorganic filler. An example of the inorganic filler may include metal oxides such as silica, alumina, and titanium oxide; hydroxides such as aluminum hydroxide, magnesium hydroxide, and potassium hydroxide; metal particles such as gold, silver, bronze, nickel, and an alloy thereof; conductive particles such as carbon, carbon nanotubes, and fullerene; glass; ceramic; and the like. Preferably, silica may be used in terms of compatibility with other components of the composition. These may be used alone or in combination of two or more.

In addition, the hard coating layer may further include a lubricant. The lubricant may improve winding efficiency, blocking resistance, wear resistance, scratch resistance, and the like. As the lubricant, waxes such as polyethylene wax, paraffin wax, synthetic wax, or montan wax; synthetic resins such as a silicone-based resin or a fluorine-based resin; and the like may be used. These may be used alone or in combination of two or more.

Hereinafter, a method of forming the hard coating layer will be described in detail.

The hard coating layer is formed by preparing a composition for forming a hard coating layer, and applying and curing the composition.

In an exemplary embodiment of the present invention, the composition for forming a hard coating layer includes silsesquioxane, a crosslinking agent, and a photoinitiator.

In addition, an epoxy-based monomer, a photoinitiator and/or a thermal initiator, a solvent, a thermal curing agent, an inorganic filler, a lubricant, an antioxidant, a UV absorber, a photostabilizer, a thermal polymerization inhibitor, a leveling agent, a surfactant, an antifriction, an antifouling agent, and the like may be further included.

The crosslinking agent may form a crosslink with an epoxy siloxane-based resin to solidify the composition for forming a hard coating and to improve the hardness of the hard coating layer.

For example, the crosslinking agent may include a compound represented by the following Chemical Formula 3. The crosslinking agent, which is an alicyclic epoxy compound identical to the epoxy unit having a structure of Chemical Formula 1 or Chemical Formula 2 described above, promotes crosslinking, maintains a refractive index of the hard coating layer so as not to cause a change in a viewing angle, may maintain the bending properties, and also does not damage transparency, which is thus preferred.

[Chemical Formula 3]

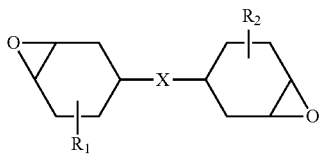

wherein $R_1$ and $R_2$ are independently of each other hydrogen or a linear or branched alkyl group having 1 to 5 carbon atoms, and X is a direct bond; a carbonyl group; a carbonate group; an ether group; a thioether group; an ester group; an amide group; a linear or branched alkylene group, an alkylidene group, or an alkoxylene group having 1 to 18 carbon atoms; a cycloalkylene group or a cycloalkylidene group having 1 to 6 carbon atoms; or a linking group thereof.

Here, a "direct bond" refers to a structure which is directly bonded without any functional group, and for example, in Chemical Formula 4, may refer to two cyclohexanes directly connected to each other. In addition, a "linking group" refers to two or more substituents described above being connected to each other. In addition, in Chemical Formula 4, the substitution positions of $R^1$ and $R^2$ are not particularly limited, but when the carbon connected to X is set at position No. 1, and the carbons connected to an epoxy group are set at position Nos. 3 and 4, it is preferred that $R_1$ and $R^2$ are substituted at position No. 6.

A content of the crosslinking agent is not particularly limited, and for example, may be 1 to 150 parts by weight with respect to 100 parts by weight of the epoxy siloxane resin. When the content of the crosslinking agent is within the above range, the viscosity of the composition may be maintained in an appropriate range, and coatability and curing reactivity may be improved.

In addition, in an exemplary embodiment of the present invention, various epoxy compounds may be further added to and used in the hard coating layer in addition to the compounds of the Chemical Formulae described above as long as the properties of the present invention are achieved, but it is preferred that the content does not exceed 20 parts by weight with respect to 100 parts by weight of the compound of Chemical Formula 2.

In an exemplary embodiment of the present invention, the epoxy-based monomer may be included at 10 to 80 parts by weight with respect to 100 parts by weight of the composition for forming a hard coating layer. Within the content range, viscosity may be adjusted, a thickness may be easily adjusted, a surface is uniform, defects in a thin film do not occur, and hardness may be sufficiently achieved, but the present invention is not limited thereto.

In an exemplary embodiment of the present invention, the photoinitiator is a cationic photoinitiator, and may initiate condensation of an epoxy-based monomer including the compounds of the above chemical formulae. As the cationic photoinitiator, for example, an onium salt and/or an organic metal salt, and the like may be used, but the present invention is not limited thereto. For example, a diaryliodonium salt, a triarylsulfonium salt, an aryldiazonium salt, an iron-arene complex, and the like may be used, and these may be used alone or in combination of two or more.

A content of the photoinitiator is not particularly limited, and for example, may be 0.1 to 10 parts by weight, preferably 0.2 to 5 parts by weight with respect to 100 parts by weight of the compound of Chemical Formula 1.

In an exemplary embodiment of the present invention, a non-limiting example of the solvent may include alcohol-based solvents such as methanol, ethanol, isopropanol, butanol, methyl cellosove, and ethyl cellosolve; ketone-based solvents such as methyl ethyl ketone, methyl butyl ketone, methyl isobutyl ketone, diethyl ketone, dipropyl ketone, and cyclohexanone; hexane-based solvents such as hexane, heptane, and octane; benzene-based solvents such as benzene, toluene, and xylene; and the like. These may be used alone or in combination of two or more.

In an exemplary embodiment of the present invention, the solvent may be included at a residual amount excluding the amount of the remaining components in the total weight of the composition.

As an exemplary embodiment, the composition for forming a hard coating layer may further include a thermal curing agent. The thermal curing agent may include a sulfonium salt-based curing agent, an amine-based curing agent, an imidazole-based curing agent, an acid anhydride-based curing agent, an amide-based thermal curing agents, and the like, and it is more preferred to further use a sulfonium-based thermal curing agent in terms of discoloration prevention and high hardness implementation. These may be used alone or in combination of two or more. A content of the thermal curing agent is not particularly limited, and for example, may be 5 to 30 parts by weight, based on 100 parts by weight of the epoxy siloxane resin. When the content of the thermal curing agent is within the above range, hardness efficiency of the composition for forming a hard coating layer may be further improved to form a cured layer having excellent hardness.

In an exemplary embodiment of the present invention, by using the composition for forming a hard coating layer, the polyimide-based film or the inorganic thin film layer may be physically protected and the mechanical physical properties of the entire laminate may be further improved. In addition, the adhesion and the coatability with the functional coating layer such as an anti-fingerprint layer may be further improved to provide a window cover film which expresses uniform physical properties over the entire area of the film.

In addition, various epoxy compounds may be further added to and used in the hard coating layer of the present invention in addition to the compounds of the Chemical Formulae described above as long as the properties of the present invention are achieved, but it is preferred that the content does not exceed 20 parts by weight with respect to 100 parts by weight of the compound of Chemical Formula 1, for achieving the object of the present invention.

A method of polymerizing an alicyclic epoxidized silsesquioxane-based compound is not limited as long as it is known in the art, but for example, the compound may be prepared by hydrolysis and a condensation reaction between alkoxy silanes in the presence of water. The hydrolysis reaction may be promoted by including a component such as an inorganic acid. In addition, the epoxysilane-based resin may be formed by polymerizing a silane compound including an epoxycyclohexyl group.

In an exemplary embodiment of the present invention, the hard coating layer may be formed by applying and curing the composition for forming a hard coating layer described above on an upper surface or a lower surface of the inorganic deposited layer. The curing may be performed by thermal curing and/or photocuring, and a method known in the art may be used.

<Functional Coating Layer>

The optical laminate according to an exemplary embodiment of the present invention may further include a functional coating layer, specifically for example, any one or more functional coating layers selected from an antistatic layer, an anti-fingerprint layer, an antifouling layer, an anti-scratch layer, a low-refractive layer, an antireflective layer, and impact shock absorption layer.

Since each of the functional coating layers is a known coating layer in the corresponding art, the specific description therefor will be omitted.

More preferably, the functional coating layer may be an anti-fingerprint layer, and by forming the anti-fingerprint layer, and when applied to the window cover film, the window cover film may feel like real glass to the touch and pollution may be prevented.

In an exemplary embodiment of the present invention, in terms of feeling like glass to the touch and preventing pollution, the anti-fingerprint layer may have a water contact angle of 105° or more, more specifically 105° or more, 108° or more, or 110 to 120° and a sliding angle of 35° or less, 30° or less, or 15 to 25°. Within the range, the slip properties are excellent and feeling like glass to the touch may be expressed, which is thus more preferred.

More specifically, the anti-fingerprint layer may be derived from a polyfunctional (meth)acrylate polymer having a (meth)acryl group, a polyfunctional urethane (meth)acrylate oligomer having 6 to 15 (meth)acryl groups, a polyfunctional (meth)acrylate monomer having 2 to 6 (meth)acryl groups, and a fluorinated (meth)acrylate monomer. In the above, a (meth)acryl group refers to a group which may have both a methacrylate group or an acrylate group.

The polyfunctional (meth)acrylate polymer is not limited, but may have a weight average molecular weight (Mw) of 10,000 to 30,000 g/mol and an acryl equivalent of 100 to 1,000 g/eq. Within the range, a curl occurrence is suppressed and antifouling properties are improved by a curing reaction with the fluorinated (meth)acrylate monomer to increase glass texture properties, which is thus preferred. Preferably, a commercialized product may be used, and an example of the commercialized product may be SMP-220A, SMP-250AP, SMP-360AP, and SMP-550AP available from Kyoeisha, 8KX-078 and 8KX-212 available from TAISEI Fine Chem., and the like, but is not limited thereto.

A polyfunctional urethane (meth)acrylate oligomer having 5 to 15 (meth)acryl groups as the functional group forms a cured product with other curable monomers, thereby further improving hardness, adhesive strength with a hard coating layer, and feeling to the touch.

The polyfunctional urethane (meth)acrylate oligomer may be synthesized, but preferably, may be a commercialized product, and an example of the commercialized product includes Miramer SC2152 and SC1020 available from Miwon Specialty Chemical Co., Ltd., Neorad P60 and P61 available from DSM, UA-3061 and UA-510H available from Kyoeisha, CN9013NS and CN9010NS available from Sartomer, and the like, but is not limited thereto. The urethane (meth)acrylate oligomer may be used at 10 to 90 parts by weight, more preferably 50 to 80 parts by weight with respect to 100 parts by weight of the polyfunctional (meth)acrylate polymer, and in the composition ratio, all of the surface hardness, adhesion, slip properties, and flexibility of the present invention may be achieved, which is thus more preferred.

The polyfunctional (meth)acrylate monomer having 2 to 6 (meth)acryl groups may be a curable monomer, and a specific example thereof includes polyfunctional acrylates such as dipentaerythritol hexa(meth)acrylate, dipentaerythritol penta(meth)acrylate, pentaerythritol tetra(meth)acrylate, ditrimethylolpropane tetra(meth)acrylate, trimethylolpropane tri(meth)acrylate, glycerol tri(meth)acrylate, tris(2-hydroxyethyl)isocyanurate tri(meth)acrylate, ethyleneglycol di(meth)acrylate, propyleneglycol (meth)acrylate, 1,3-butanediol di(meth)acrylate, 1,4-butanediol di(meth)acrylate, 1,6-hexanediol di(meth)acrylate, neopentylglycol di(meth)acrylate, diethyleneglycol di(meth)acrylate, triethyleneglycol di(meth)acrylate, dipropyleneglycol di(meth)acrylate, bis(2-hydroxyethyl)isocyanurate di(meth)acrylate, and hydroxyethyl(meth)acrylate. An example of the commercialized product may be M340 available from Miwon Specialty Chemical Co., Ltd., and the like.

The polyfunctional (meth)acrylate monomer may be used at to 70 parts by weight, more preferably 30 to 60 parts by weight with respect to 100 parts by weight of the polyfunctional (meth)acrylate polymer, and in the composition ratio, all of the surface hardness, adhesion, slip properties, and flexibility of the present invention may be achieved, which is thus more preferred.

The fluorinated (meth)acrylate monomer is not limited as long as it has a fluorine-substituted alkyl group, a fluorine-substituted alkyloxy group, and a fluorine-substituted polyalkylene glycol group. In addition, in an exemplary embodiment of the present invention, when a compound containing a functional group represented by the following Chemical Formulae 4 and 5 is used for achieving the effect of the present invention more extremely, a better effect may be achieved in anti-fingerprint properties, feeling like glass to the touch, slip properties, surface hardness, and the like, which is thus more preferred. In particular, in the following structural formula, a better effect may be achieved when an n value is 10 or more and less than 30, which is thus very preferred.

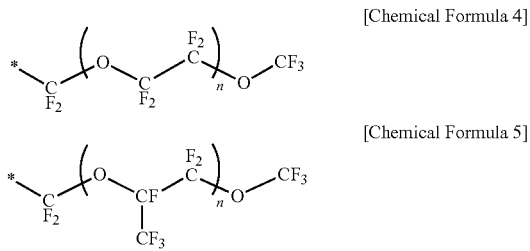

[Chemical Formula 4]

[Chemical Formula 5]

wherein n is an integer of 3 to 30.

The functional group represented by Chemical Formulae 4 and 5 has a form in which fluorine is concentrated in a molecule, and thus, a fluorine content may be further concentrated in the surface layer of the anti-fingerprint layer, that is, the outermost layer of the window cover film, and therefore, a window cover film having excellent antifouling properties and water resistance may be provided. In addition, the film has excellent slip properties so that a user may feel like touching real glass.

In particular, among the fluorine-substituted (meth)acryl-based monomer, the effect is more significantly shown in those in which the n value is 10 to 30 in Chemical Formulae 4 and 5, which is thus more preferred.

It is more preferred that a content of the fluorine-substituted (meth)acryl-based monomer is 0.1 to 20 parts by weight, preferably 5 to 15 parts by weight with respect to 100 parts by weight of the polyfunctional (meth)acrylate polymer in terms of feeling like glass to the touch, surface hardness, antifouling properties, and water resistance, and also, the content is more preferred since slip properties and the bending properties of the finally laminated window cover film are better, but the present invention is not limited thereto.

Specifically, a commercialized example of the fluorinated (meth)acrylate may be RS75 available from DIC, Optool DAC-HP available from DAIKIN, and the like, but is not limited thereto.

Next, a method of forming the anti-fingerprint layer will be described.

The anti-fingerprint layer may be obtained by applying and curing an anti-fingerprint composition a polyfunctional (meth)acrylate polymer, a polyfunctional urethane (meth)acrylate oligomer having 6 to 15 (meth)acryl groups, a polyfunctional (meth)acrylate monomer having 2 to 6 (meth)acryl groups, and a fluorinated (meth)acrylate monomer. More specifically, the anti-fingerprint composition may include a photoinitiator and a solvent.

The solvent is not limited as long as it dissolves resins used in the anti-fingerprint composition, but specifically for example, benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N—(N-octyl)pyrrolidinone, N—(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methylether, diethyleneglycol monobutyl ether, dimethylsulfoxide, dimethyl formamide, ethylene glycol, hexafluoroantimonate, monoalkyl ether of ethylene glycol, dialkyl ether of ethylene glycol, or derivatives thereof (cellosolve), and the like may be used. In addition, any one of the solvents may be used or the solvent may be used in combination of two or more.

A content of the solvent is not limited, but may be 30 to 90 wt %, more preferably 50 to 70 wt %, in the total weight of the anti-fingerprint composition.

The photoinitiator is not limited as long as it is commonly used in the polyfunctional (meth)acrylate-based resin, but a specific example thereof includes acetophenones, benzophenones, benzoins, propiophenones, benzyls, acylphosphic oxides, Michler's benzoyl benzoate, α-amyloxime ester, tetramethylfuran monosulfide, thioxanthones, and the like. More specifically, as the photoinitiator, benzophenone, 2-methyl-1-[4-(methylthio)phenyl]2-morpholinepropane-1-one, diphenylketonebenzyldimethylketal, 2-hydroxy-2-methyl-1-phenyl-1-one, 4-hydroxylcyclophenylketone, dimethoxy-2-phenylacetophenone, anthraquinone, fluorene, triphenylamine, carbazole, 3-methyl acetophenone, 4-chloroacetophenone, 4,4-dimethoxyacetophenone, 4,4-diaminobenzophenone, 1-hydroxycyclohexylphenylketone, and the like may be used, but the present invention is not limited thereto.

In addition, the anti-fingerprint composition may further include inorganic particles, if necessary, and by including the inorganic particles, slip properties may be further improved and wear resistance may be further improved.

As the inorganic particles, any one or a mixture thereof selected from silica, alumina, and the like having an average particle diameter of 50 nm or less may be used, and within the average particle diameter, dispersibility is excellent, slip properties are excellent, the physical properties of a ratio of a static friction coefficient a to a kinetic friction coefficient b according to the present invention of 0.5 to 1.5 are satisfied, which is thus preferred.

The inorganic particle may be surface-treated for increasing dispersibility. A content of the inorganic particles is not limited, but for example, may be 0.1 to 5 wt %, more specifically 1 to 3 wt % in the composition excluding a solvent (solid content).

In the present invention, by using the anti-fingerprint composition, a window cover film which feels like glass to the touch as described above, has excellent durability, and has a curl suppression characteristic may be provided. The "curl suppression characteristic" may refer to a curl amount being significantly small. The curl amount may refer to a vertical height from the lowest position (for example, a center) to the vertex of the window cover film, for each vertex of the sample obtained by cutting the film into a square which is inclined at an angle of 45° to the MD direction and has each side of 10 cm in length.

In the present invention, the MD direction is a machine direction, and refers to a direction in which the film moves along an automated machine when the film is drawn or laminated by an automation process. As the curl is measured for the sample inclined at the angle of 45° to the MD direction, the curl at each vertex means curls to the MD direction and a direction perpendicular to the MD direction, thereby distinguishing the curls in each direction. In some exemplary embodiment, the window cover film may exhibit the curl amount of 5 mm or less.

<Flexible Display Panel>

In an exemplary embodiment of the present invention, the window cover film using the optical laminate according to the exemplary embodiment and a flexible display panel or a flexible display device including the same may be provided.

Here, the window cover film may be used as an outermost surface window substrate of the flexible display device. The flexible display device may be various image displays such as a common liquid crystal display, an electroluminescent display, a plasma display, and a field emission display.

Hereinafter, the present invention will be described in more detail with reference to the Examples and Comparative Examples. However, the following Examples and Comparative Examples are only an example for describing the present invention in more detail, and do not limit the present invention in any way.

Hereinafter, the physical properties were measured as follows:

1) Light Transmittance

In accordance with the standard of ASTM D1746, a total light transmittance was measured at the entire wavelength region of 400 to 700 nm using a spectrophotometer (from Nippon Denshoku, COH-400) and a light transmittance was measured at 388 nm using UV/Vis (Shimadzu, UV3600), on a film having a thickness of 50 μm. The unit was %.

2) Haze and Haze Change Rate

In accordance with the standard of ASTM D1003, the haze was measured using a spectrophotometer (from Nippon Denshoku, COH-400), on a film having a thickness of 50 μm. The unit was %.

In addition, after the produced window cover film was stored for 0.5 hours in a state of being immersed in methyl ethyl ketone (MEK), the solvent was removed, and the haze of the film was measured to calculate the haze change rate (%) according to the following equation:

Haze change rate=(haze after immersed in solvent−haze before immersed in solvent)/haze before immersed in solvent×100

3) Water Vapor Transmission Rate (WVTR)

The produced optical laminate was cut into a size of 20×20 mm based on JIS K-7129 and a moisture permeability was measured using moisture permeability measuring equipment (Mocon PERMATRAN-W Model 3/61).

4) Curl Occurrence after being Exposed to High-Temperature and High-Humid Conditions A film was allowed to stand under an environment of 60° C. and 90% RH confidence for 500 hours using a high-temperature and high-humidity chamber, and then at room temperature (25° C., 50% RH) for 24 hours for stabilization. After stabilization, a length from the bottom to each raised vertex was measured and curl change was evaluated.

5) Light Resistance

UV was irradiated from a light source at 340 nm using UVA-340 equipment from Q-Lab. Here, a temperature of the equipment chamber is 60° C. and irradiation is performed at a light source intensity of 0.63 W/m$^2$ at 8 hours/cycle for a total of 12 cycles successively. Here, a half area of the sample was wrapped using foil so that the part was not exposed to UV. After 12 cycles of light exposure were completed, the sample was allowed to stand at room temperature for 24 hours, and the part covered with the foil and the part exposed were examined.

A yellow index change amount ΔYI is a value obtained by subtracting the yellow index of the UV-unirradiated part from the yellow index of the UV-irradiated part.

6) Modulus and Elongation at Break

In accordance with ASTM D882, the elongation at break was measured using UTM 3365 available from Instron, under the condition of pulling a polyamideimide film having a length of 50 mm and a width of 10 mm at 50 mm/min at 25° C.

The thickness of the film was measured and the value was input to the instrument. The unit of the modulus was GPa and the unit of the elongation at break was %.

7) Weight Average Molecular Weight

The weight average molecular weight and the polydispersity index of the produced film were measured by dissolving a film sample in a DMAc eluent containing 0.05 M LiBr and using GPC (Waters GPC system, Waters 1515 isocratic HPLC Pump, Waters 2414 Reflective Index detector). In the measurement, Olexis, Polypore, and mixed D columns were connected as a GPC column, a DMAc solution was used as a solvent, polymethylmethacrylate (PMMA STD) was used as a standard, and the analysis was performed at 35° C. at a flow rate of 1 mL/min.

8) Yellow Index (YI) and b* Value

The yellow index and the b* value were measured using a colorimeter (from HunterLab, ColorQuest XE), on a film having a thickness of 50 μm, in accordance with the standard of ASTM E313.

[Preparation Example 1] Preparation of Composition for Forming a Substrate Layer Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and a solid content was adjusted to 10 wt %. Thereafter, the reactant was precipitated in an excessive amount of methanol and filtered to obtain a solid content, which was dried under vacuum at 50° C. for 6 hours or more to obtain an oligomer, and the prepared oligomer had a formula weight (FW) of 1670 g/mol.

N,N-dimethylacetamide (DMAc), 100 mol of the oligomer, and 28.6 mol of 2,2'-bis(trifluoromethyl)-benzidine (TFMB) were added to the reactor and sufficient stirring was performed.

After confirming that the solid raw material was completely dissolved, fumed silica (surface area of 95 m$^2$/g, <1 μm) was added to DMAc at a content of 1000 ppm relative to the solid content, and added to the reactor after being dispersed using ultrasonic waves. 64.3 mol of cyclobutanetetracarboxylic dianhydride (CBDA) and 64.3 mol of 4,4'-hexafluoroisopropylidene diphthalic anhydride (6FDA)

were subsequently added, sufficient stirring was performed, and the mixture was polymerized at 40° C. for 10 hours. Here, the solid content was 20%. Subsequently, each of pyridine and acetic anhydride was added sequentially at 2.5-fold relative to the total content of dianhydride, and stirring was performed at 60° C. for 12 hours.

After the polymerization was completed, the polymerization solution was precipitated in an excessive amount of methanol and filtered to obtain a solid content, which was dried under vacuum at 50° C. for 6 hours or more to obtain polyamideimide powder. The powder was diluted and dissolved at 20% in DMAc to prepare a composition for forming a substrate layer.

[Preparation Example 2] Preparation of Composition for Forming Hard Coating Layer 2-(3,4-epoxycyclohexyl)ethyltrimethoxysilane (ECTMS, TCI) and water were mixed at a ratio of 24.64 g:2.70 g (0.1 mol:0.15 mol) to prepare a reaction solution, and the reaction solution was added to a 250 mL 2-neck flask. 0.1 mL of a tetramethylammonium hydroxide catalyst (Aldrich) and 100 mL of tetrahydrofuran (Aldrich) were added to the mixture, and stirring was performed at 25° C. for 36 hours. Thereafter, layer separation was performed and a product layer was extracted with methylene chloride (Aldrich), moisture was removed from the extract with magnesium sulfate (Aldrich), and the solvent was dried under vacuum to obtain an epoxy siloxane-based resin. The weight average molecular weight of the epoxy siloxane-based resin was measured using gel permeation chromatography (GPC), and the result was 2,500 g/mol.

A composition in which 30 g of the epoxy siloxane-based resin as prepared above, 10 g of (3',4'-epoxycyclohexyl)methyl 3,4-epoxycyclohexanecarboxylate, and 5 g of bis[(3,4-epoxycyclohexyl)methyl] adipate as a crosslinking agent, 0.5 g of (4-methylphenyl)[4-(2-methylpropyl)phenyl]iodoniumhexafluorophosphate as a photoinitiator, and 54.5 g of methyl ethyl ketone were mixed was prepared.

Example 1

The composition for forming a substrate layer prepared from Preparation Example 1 was coated on a polyethylene terephthalate (PET) substrate film using an applicator, dried at 80° C. for 30 minutes and 100° C. for 1 hour, and cooled to room temperature to prepare a film. Thereafter, a stepwise heat treatment was performed at a heating rate of 20° C./min at 100 to 200° C. and 250 to 300° C. for 2 hours.

The thus-produced polyamideimide film had a thickness of 50 μm, a transmittance at 388 nm of 75%, a total light transmittance of 89.73%, a haze of 0.4%, a yellow index (YI) of 1.9, a value of 1.0, a modulus of 1.0 GPa, an elongation at break of 21.2%, a weight average molecular weight of 310,000 g/mol, a polydispersity index (PDI) of 2.11, and a pencil hardness of HB/750 g.

One surface of the thus-produced polyimide film having a thickness of 50 μm was treated under conditions of 1.9 kW, a distance between the substrate and a plasma slit of 7 mm, a plasma slit gap of 2 mm, and a line speed of 3 m/min, using in-line oxygen plasma equipment. The plasma-treated film was placed in a chamber at 100° C., trimethyl aluminum $(Al(CH_3)_3)$, argon (Ar), moisture $(H_2O)$, and argon (Ar) were sequentially introduced to a polymer substrate surface for exposure times of 1, 5, 3, and 15 seconds, respectively, and this cycle was repeated 100 times to form an aluminum oxide $(Al_2O_3)$ film having a density of 2.75 $g/cm^2$ and a deposition thickness of 13 nm which is a metal compound film.

The composition for forming a hard coating layer prepared in Preparation Example 2 was applied on the aluminum oxide film using a Meyer bar, cured at 60° C. for 5 minutes, irradiated with UV at 1 $J/cm^2$ using a high-pressure metal lamp, and thermally cured at 120° C. for 15 minutes to form a hard coating layer having a thickness of 10 μm.

The thus-produced window cover film had the lamination structure as shown in FIG. 1, and the physical properties thereof were measured and are shown in the following Table 1.

Example 2

An aluminum oxide film was formed by performing ALD deposition in the same manner as in Example 1, except that the plasma treatment was not performed, the introduction time of trimethyl aluminum $(Al(CH_3)_3)$ was changed to 3 seconds, and the purge time was changed to 10 seconds, and a window cover film was produced.

The physical properties of the thus-produced window cover film were measured, and are shown in the following Table 1.

Example 3

A window cover film was produced under the same conditions as in Example 1, except that the aluminum oxide film was formed on both surfaces of the polyamideimide film.

The thus-produced window cover film had the lamination structure as shown in FIG. 2, and the physical properties thereof were measured and are shown in the following Table 1.

Example 4

A window cover film was produced under the same conditions as in Example 1, except that the aluminum oxide film was formed on all six surfaces of the polyamideimide film, and the hard coating layer was formed on one surface.

The thus-produced window cover film had the lamination structure as shown in FIG. 3, and the physical properties thereof were measured and are shown in the following Table 1.

Example 5

The composition for forming a hard coating layer prepared in Preparation Example 2 was applied on one surface of the polyimide film having a thickness of 50 μm produced in the same manner as in Example 1 using a Meyer bar, cured at 60° C. for 5 minutes, irradiated with UV at 1 $J/cm^2$ using a high-pressure metal lamp, and thermally cured at 120° C. for 15 minutes to form a hard coating layer having a thickness of 10 μm.

Thereafter, ALD deposition was performed on the hard coating layer in the same manner as in Example 1 to form an aluminum oxide film and produce a window cover film.

The thus-produced window cover film had the lamination structure as shown in FIG. 4, and the physical properties thereof were measured and are shown in the following Table 1.

Example 6

The composition for forming a hard coating layer prepared in Preparation Example 2 was applied on one surface of the polyimide film having a thickness of 50 μm produced in the same manner as in Example 1 using a Meyer bar, cured at 60° C. for 5 minutes, irradiated with UV at 1 J/cm² using a high-pressure metal lamp, and thermally cured at 120° C. for 15 minutes to form a hard coating layer having a thickness of 10 μm.

Thereafter, ALD deposition was performed on the hard coating layer and in a side surface of the polyimide-based film in the same manner as in Example 1 to form an aluminum oxide film and produce a window cover film.

The thus-produced window cover film had the lamination structure as shown in FIG. 5, and the physical properties thereof were measured and are shown in the following Table 1.

Comparative Example 1

A film was produced in the same manner as in Example 1, except that the inorganic thin film layer was not formed. That is, a film in which a hard coating layer was formed on one surface of a polyimide film was produced.

The physical properties of the thus-prepared film were measured, and shown in the following Table 1.

lent solvent resistance, in particular, excellent solvent resistance to a specific solvent, it is easy to form a functional coating layer such as a hard coating layer.

In addition, the window cover film according to an exemplary embodiment of the present invention has excellent coatability in forming a coating layer such as a hard coating layer, has a low surface roughness, and hardly has a pin hole occurrence.

In addition, the window cover film according to an exemplary embodiment of the present invention has no occurrence of microcracks even after repeated bending. Accordingly, durability and long life of the flexible display may be secured.

In addition, the window cover film according to an exemplary embodiment of the present invention has excellent light resistance, and has a yellow index change amount of 2 or less, the yellow index change amount being measured after irradiating UV from a light source at 340 nm using UVA-340 equipment from Q-Lab, and thus, less yellowed even when exposed to ultraviolet rays for a long time.

Hereinabove, although the present invention has been described by specified matters and specific exemplary

TABLE 1

| | Example 1 | Example 2 | Example 3 | Example 4 | Example 5 | Example 6 | Comparative Example 1 |
|---|---|---|---|---|---|---|---|
| Light transmittance at 388 nm (%) | 42.2 | 48.4 | 39.1 | 29.5 | 34.1 | 38.2 | 58.1 |
| Total light transmittance (%) | 88.8 | 89.1 | 87.9 | 88.1 | 88.5 | 87.4 | 89.4 |
| Haze (%) | 0.4 | 0.5 | 0.45 | 0.52 | 0.41 | 0.43 | 0.3 |
| Haze change rate (%) | 8.2 | 7.5 | 9.3 | 6.1 | 8.1 | 5.4 | 17 |
| Water vapor transmission rate (g/m² · day) | $3.0 \times 10^{-1}$ | $1.2 \times 10^{-1}$ | $1.8 \times 10^{-1}$ | $9.2 \times 10^{-2}$ | $8.8 \times 10^{-2}$ | $1.7 \times 10^{-1}$ | $2.7 \times 10$ |
| Curl occurrence (mm) after high-temperature and high-humidity | 7.1 | 6.8 | 5.3 | 6.0 | 8.0 | 7.5 | 37 |
| Light resistance YI before UV irradiation | 2.0 | 2.1 | 2.0 | 1.5 | 2.0 | 2.0 | 2.1 |
| YI after UV irradiation | 3.1 | 3.0 | 3.2 | 3.0 | 3.3 | 2.8 | 5.5 |
| Δ YI | 1.1 | 0.9 | 1.2 | 1.5 | 1.3 | 0.8 | 3.4 |

As seen from the table above, durability and light resistance under high-temperature and high-humidity were able to be improved by improving a water vapor transmission rate and UV transmittance properties after forming the inorganic deposited layer by ALD, and surface characteristics to realize high adhesiveness with the hard coating layer may be realized.

The window cover film according to an exemplary embodiment of the present invention may have a light transmittance measured at a specific wavelength, specifically 388 nm of 50% or less, preferably 25 to 50%, and may have excellent long-term durability and weather resistance.

In addition, the window cover film according to an exemplary embodiment of the present invention is flexible and has excellent bending properties, and thus, may be restored to its original form without an occurrence of permanent deformation and/or damage even in the case of repetitive occurrences of certain deformation.

Accordingly, the window cover film may be applied to a display having a curved shape, a foldable device, or the like.

In addition, since the window cover film according to an exemplary embodiment of the present invention has excelembodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:
1. A window cover film comprising: a polyamideimide-based film prepared by polymerizing an amine-terminated polyamide oligomer derived from a first fluorine-based aromatic diamine and an aromatic diacid dichloride with a second fluorine-based aromatic diamine, an aromatic dianhydride, and a cycloaliphatic dianhydride, wherein the first fluorine-based aromatic diamine and the second fluorine-based aromatic diamine may be chemically the same or different, an inorganic thin film layer formed on at least one surface of the polyamideimide-based film, and a hard coating layer formed on at least one surface of the inorganic thin film layer, wherein the hard coating layer is formed by curing a composition comprising an alicyclic epoxidized silsesquioxane-based compound, and wherein the window cover film has a light transmittance measured at 388 nm of 50% or less and a total light transmittance measured at 400 to 700 nm of 87% or more, wherein the window cover film has a yellow index of 2.1 or less and a yellow index change rate of 1.5 or less, the yellow index change rate being measured after performing a process of irradiating UV at an intensity of 0.63 W/m² from a light source at 340 nm at a chamber temperature of 60° C., 12 times successively at 8 hours/cycle, and wherein the window cover film has a curl amount of 5 mm or less measured by cutting a 10 cm×10 cm square sample from the film inclined at an angle of 45° to a MD direction of the film and exposing the square sample to 60° C. and 90% humidity for 500 hours and then at 25° C. and 50% humidity for 24 hours, wherein the curl amount is a maximum vertical height measured from the lowest position of the square sample to each vertex of the square sample.

2. The window cover film of claim 1, wherein the window cover film has a water vapor transmission rate of 5.0×10⁻¹ g/m²/day or less.

3. The window cover film of claim 1, wherein the window cover film has a haze of 1.0% or less.

4. The window cover film of claim 1, wherein the window cover film has a haze change rate of 10% or less, the haze change rate being measured after storing the window cover film in a state of being immersed in methyl ethyl ketone for 0.5 hours.

5. The window cover film of claim 1, wherein the inorganic thin film layer is any one or two or more selected from metals, metal oxides, metal nitrides, metal carbides, metal carbonitrides, and metal sulfides.

6. The window cover film of claim 1, wherein the inorganic thin film layer is at least one selected from aluminum oxide, silicon oxide, titanium oxide, and zinc oxide.

7. The window cover film of claim 1, wherein the inorganic thin film layer is formed by atomic layer deposition (ALD).

8. The window cover film of claim 1, wherein the inorganic thin film layer is formed on all six surfaces of the polyamideimide-based film.

9. The window cover film of claim 1, further comprising: a functional coating layer of any one or more selected from an antistatic layer, an anti-fingerprint layer, an antifouling layer, an anti-scratch layer, a low-refractive layer, an anti-reflective layer, and impact shock absorption layer.

10. The window cover film of claim 1, wherein the polyamideimide-based film has an elongation at break in accordance with ASTM D882 of 8% or more and a modulus of 6 GPa more.

11. The window cover film of claim 1, wherein the polyamideimide-based film has the light transmittance of 5% or more as measured at 388 nm in accordance with ASTM D1746, a haze of 2.0% or less, and a b* value of 2.0 or less.

12. The window cover film of claim 1, wherein
the polyamideimide-based film has a thickness of 10 to 500 μm,
the inorganic thin film layer has a thickness of 2 to 500 nm, and
the hard coating layer has a thickness of 1 to 50 μm.

13. A flexible display panel comprising the window cover film of claim 1.

* * * * *